United States Patent
Nakaiso

(10) Patent No.: US 9,018,732 B2
(45) Date of Patent: Apr. 28, 2015

(54) DIELECTRIC THIN FILM ELEMENT AND METHOD FOR PRODUCING THE SAME

(75) Inventor: Toshiyuki Nakaiso, Nagaokakyo (JP)

(73) Assignee: Murata Manufacturing Co., Ltd., Nagaokakyo-Shi, Kyoto-Fu (JP)

( * ) Notice: Subject to any disclaimer, the term of this patent is extended or adjusted under 35 U.S.C. 154(b) by 351 days.

(21) Appl. No.: 13/353,702

(22) Filed: Jan. 19, 2012

(65) Prior Publication Data

US 2012/0119328 A1    May 17, 2012

Related U.S. Application Data

(63) Continuation of application No. PCT/JP2010/062176, filed on Jul. 20, 2010.

(30) Foreign Application Priority Data

Jul. 22, 2009  (JP) .................................. 2009-171192

(51) Int. Cl.
*H01L 21/02* (2006.01)
*H01G 4/12* (2006.01)
*H01G 4/33* (2006.01)

(52) U.S. Cl.
CPC ... *H01G 4/12* (2013.01); *H01G 4/33* (2013.01)

(58) Field of Classification Search
USPC ........................... 257/532, E29.342, E21.008
See application file for complete search history.

(56) References Cited

U.S. PATENT DOCUMENTS

| 7,196,898 | B2 | 3/2007 | Osaka et al. |
| 7,675,139 | B2 | 3/2010 | Nomura et al. |
| 7,785,977 | B2 | 8/2010 | Nomura et al. |
| 7,836,567 | B2 | 11/2010 | Osaka et al. |
| 2007/0139859 | A1* | 6/2007 | Osaka et al. ............... 361/301.1 |
| 2008/0037200 | A1* | 2/2008 | Koutsaroff et al. ........ 361/321.5 |
| 2008/0164563 | A1* | 7/2008 | Nomura et al. ............... 257/532 |
| 2010/0178878 | A1 | 7/2010 | Kurioka |

FOREIGN PATENT DOCUMENTS

| JP | 2002299157 | 10/2002 |
| JP | 2005159259 | 6/2005 |
| JP | 2007-081325 A | 3/2007 |
| JP | 2008235088 | 10/2008 |
| WO | WO-2006117912 A1 | 11/2006 |
| WO | WO-2008149622 | 12/2008 |

OTHER PUBLICATIONS

PCT/JP2010/062176 Written Opinion dated Nov. 2, 2010.

* cited by examiner

*Primary Examiner* — Timor Karimy
(74) *Attorney, Agent, or Firm* — Arent Fox LLP

(57) ABSTRACT

A dielectric thin film element that includes a substrate, a close-adhesion layer formed on one principal surface of the substrate, a capacitance section having a lower electrode layer formed on the close-adhesion layer, a dielectric layer formed on the lower electrode layer, and an upper electrode layer formed on the dielectric layer, and a protective layer formed to cover the capacitance section, wherein the end of the close-adhesion layer is exposed from the protective layer.

8 Claims, 6 Drawing Sheets

DIELECTRIC THIN FILM ELEMENT AND METHOD FOR PRODUCING THE SAME

CROSS REFERENCE TO RELATED APPLICATIONS

The present application is a continuation of International application No. PCT/JP2010/062176, filed Jul. 20, 2010, which claims priority to Japanese Patent Application No. 2009-171192, filed Jul. 22, 2009, the entire contents of each of which are incorporated herein by reference.

FIELD OF THE INVENTION

The present invention relates to a dielectric thin film element and a method for producing the same.

BACKGROUND OF THE INVENTION

In recent years, studies on dielectric thin film elements such as a thin film capacitor and an anti-fuse element have been more and more eagerly carried out. A dielectric thin film element includes a capacitance section having a dielectric layer and upper and lower electrode layers that oppose the dielectric layer, and scale reduction and thickness reduction can be made. However, there is a fear that the characteristics of the capacitance section of the dielectric thin film element may be deteriorated by penetration of water. For this reason, dielectric thin film elements having various structures have been proposed in order to improve humidity resistance.

For example, in patent document 1, a dielectric thin film element formed on a substrate 101 and provided with a capacitance section having a dielectric layer 102, a lower electrode layer 103, and an upper electrode layer 104 is disclosed, as shown in FIG. 8. Further, the end of the capacitance section is covered with an insulating protective layer 105 made of an inorganic substance or a resin. Also, the insulating protective layer 105 is covered with a metal thin film 106. The document states that the penetration of water from the outside can be shut out by this lamination structure of the insulating protective layer 105 and the metal thin film 106.

Patent document 1: Japanese Patent Application Laid-open (JP-A) No. 2002-299157 Gazette

SUMMARY OF THE INVENTION

However, the constitution of patent document 1 has a problem of low close-adhesion property between the insulating protective layer 105 and the substrate 101. For this reason, there are a case in which the insulating protective layer 105 is peeled off by external stress and a case in which defects such as voids are generated between the insulating protective layer 105 and the substrate 101. For this reason, there is a fear of deterioration of initial characteristics of the dielectric thin film element. Also, even if the initial characteristics are satisfied, there is a fear of deterioration of characteristics after a reliability test by the penetration of water through the defects.

The present invention has been made in view of these circumstances, and an object thereof is to provide a dielectric thin film element having high humidity resistance and causing little deterioration of characteristics.

The dielectric thin film element according to the present invention is a dielectric thin film element including: a substrate; a close-adhesion layer formed on one principal surface of the substrate; a capacitance section having a lower electrode layer formed on the close-adhesion layer, a dielectric layer formed on the lower electrode layer, and an upper electrode layer formed on the dielectric layer; and a protective layer formed to cover the capacitance section, wherein the end of the close-adhesion layer is exposed from the protective layer.

In such a case, the close-adhesion layer will intervene between the protective layer and the substrate. Therefore, peeling-off of the protective layer from the substrate or generation of defects between the protective layer and the substrate can be prevented.

The dielectric thin film element according to the present invention preferably includes a metal film formed on at least a part of the end of the protective layer, the close-adhesion layer being in contact with the metal film.

In such a case, the penetration of water into the defects between the protective layer and the substrate can be prevented by the presence of the metal film.

In the dielectric thin film element according to the present invention, the protective layer preferably has an inorganic protective layer and an organic protective layer, the metal film being formed to cover the outer circumferential part of the interface between the inorganic protective layer and the organic protective layer.

In such a case, the penetration of water through the outer circumferential part of the interface between the inorganic protective layer and the organic protective layer can be prevented.

In the dielectric thin film element according to the present invention, the inorganic protective layer has a multi-layer structure.

In such a case, an effect of reduction of leakage current is produced.

Also, the present invention provides a method for producing a dielectric thin film element constituted as shown below.

The method for producing a dielectric thin film element according to the present invention is a method for producing a dielectric thin film element including a substrate; a close-adhesion layer formed on one principal surface of the substrate; a capacitance section having a lower electrode layer formed on the close-adhesion layer, a dielectric layer formed on the lower electrode layer, and an upper electrode layer formed on the dielectric layer; and a protective layer formed to cover the capacitance section, the method including steps of: forming a close adhesion layer on one principal surface of a substrate; forming a capacitance section having a lower electrode layer, a dielectric layer, and an upper electrode layer, on the close adhesion layer; forming a protective layer to cover the capacitance section; and forming an opening that penetrates through the protective layer and the dielectric layer, and simultaneously removing a part of the close-adhesion layer.

In such a case, by simultaneously processing the dielectric layer and the close-adhesion layer, the processing can be carried out at a low cost.

The method for producing a dielectric thin film element according to the present invention preferably includes a step of simultaneously forming a metal film formed on at least a part of the end of the protective layer and an extraction electrode connected to at least one of the upper electrode layer and the lower electrode layer, after the step of removing a part of the close-adhesion layer.

In such a case, the dielectric thin film element can be fabricated at a low cost because the metal film and the extraction electrode are simultaneously formed.

In the method for producing a dielectric thin film element according to the present invention, the dielectric layer and the close-adhesion layer are preferably constituted of materials of the same composition system or of the same materials.

In such a case, the simultaneous processing of the dielectric layer and the close-adhesion layer is facilitated.

In the method for producing a dielectric thin film element according to the present invention, the step of forming the close-adhesion layer preferably includes a step of performing a heating treatment after applying a dielectric source material solution containing an organic metal compound.

In such a case, the dielectric thin film element can be fabricated at a low cost.

In the method for producing a dielectric thin film element according to the present invention, the step of forming the inorganic insulating layer preferably includes a step of performing a heating treatment after applying a dielectric source material solution containing an organic metal compound.

In such a case, the dielectric thin film element can be fabricated at a low cost.

In the dielectric thin film element according to the present invention, the close-adhesion layer intervenes between the protective layer and the substrate. Therefore, peeling-off of the protective layer from the substrate or generation of defects between the protective layer and the substrate can be prevented. Accordingly, a dielectric thin film element having high humidity resistance and causing little deterioration of characteristics can be provided.

DETAILED DESCRIPTION OF THE INVENTION

Hereafter, embodiments for carrying out the present invention will be described.

Figure 1:
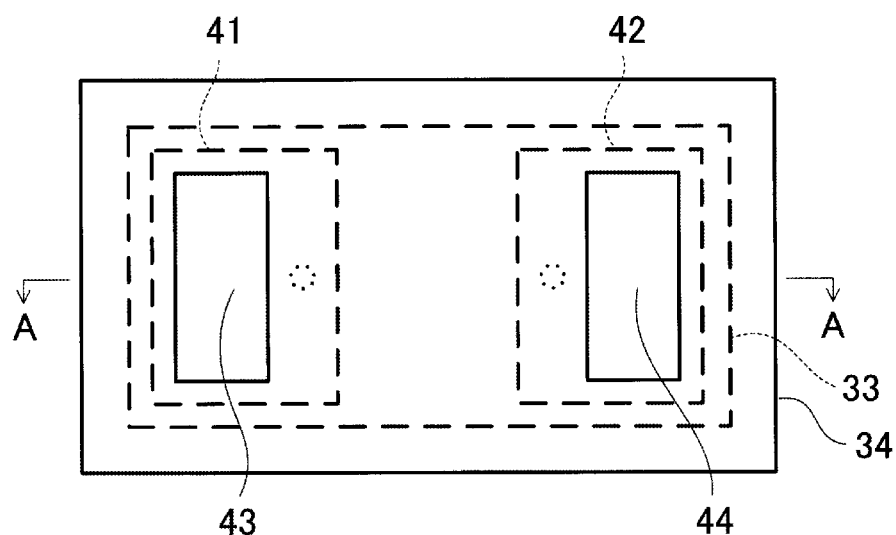
FIG. 1 is a plan view showing one embodiment of a dielectric thin film element according to the present invention. (Experimental Example 1)
Figure 2:
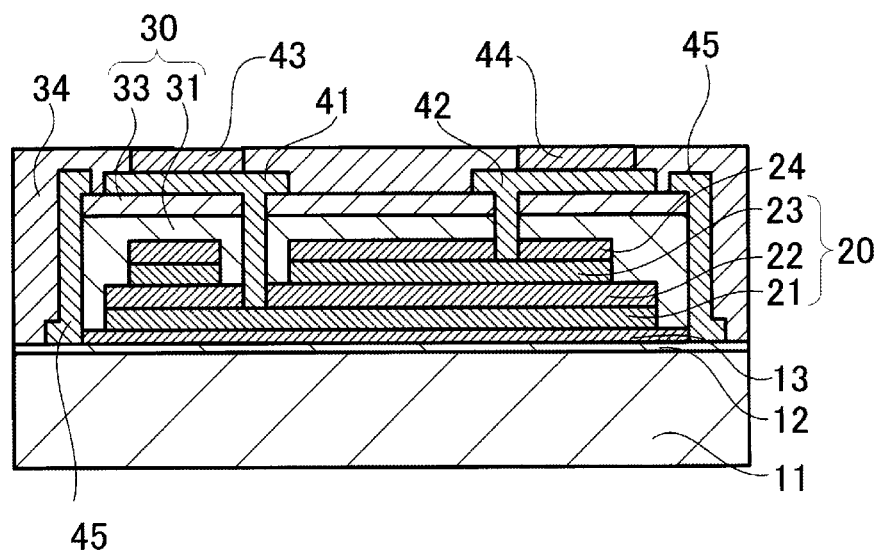
FIG. 2 is an A-A cross-sectional view of FIG. 1. (Experimental Example 1)

FIG. 1 is a plan view of a dielectric thin film element 10 according to the present invention. Also, FIG. 2 is an A-A cross-sectional view of FIG. 1.

The dielectric thin film element 10 includes a substrate 11, a close-adhesion layer 13, a capacitance section 20, and a protective layer 30.

The material of the substrate 11 may be, for example, a Si single-crystal substrate (hereafter referred to as "Si substrate"). An oxide layer 12 is preferably formed on the surface of the substrate 11. The oxide layer 12 is disposed for the purpose of preventing mutual diffusion of the substrate 11 and the close-adhesion layer 13. The oxide layer 12 is formed, for example, by performing a thermal treatment on the substrate 11.

The close-adhesion layer 13 is formed on one principal surface of the substrate 11. The close-adhesion layer 13 is disposed for the purpose of ensuring the close-adhesion property between the oxide layer 12 of the substrate 11 and the lower electrode layer 21. At this time, the close-adhesion layer 13 and a dielectric layer 22 are preferably constituted of a material of the same composition system. The material of the same composition system means a material having a different ratio of the principal constituent elements or a material containing different trace elements. Also, the close-adhesion layer 13 is more preferably constituted of the same material as that of the dielectric layer 22. When the close-adhesion layer 13 and the dielectric layer 22 are constituted of materials of the same composition system or of the same materials, simultaneous processing of the close-adhesion layer 13 and the dielectric layer 22 is advantageously facilitated.

The capacitance section 20 has the lower electrode layer 21, the dielectric layer 22, and an upper electrode layer 23. The lower electrode layer 21 is formed on the close-adhesion layer 13. Also, the dielectric layer 22 is formed on the lower electrode layer 21. Also, the upper electrode layer 23 is formed on the dielectric layer 22.

For the lower electrode layer 21 and the upper electrode layer 23, a metal material having electric conductivity is used. Specifically, a noble metal having good electric conductivity, being excellent in oxidation resistance, and having a high melting point is preferable. Examples of the noble metal include Au and Pt.

For the dielectric layer 22, a dielectric material is used. Examples of the dielectric material include $(Ba, Sr)TiO_3$ (hereafter referred to as "BST"), $SrTiO_3$, $BaTiO_3$, $Pb(Zr, Ti)O_3$, and bismuth layered compound such as $SrBi_4Ti_4O_{15}$.

Further, an inorganic insulating layer 24 is disposed on the upper electrode layer 23. The inorganic insulating layer 24 is disposed, for example, for the purpose of improving the close-adhesion property between the upper electrode layer 23 and the protective layer 30. At this time, the inorganic insulating layer 24 and the close-adhesion layer 13 are preferably constituted of a material of the same composition system. Also, the inorganic insulating layer 24 is more preferably constituted of the same material as that of the close-adhesion layer 13. When the inorganic insulating layer 24 and the close-adhesion layer 13 are constituted of materials of the same composition system or of the same materials, simultaneous processing of the inorganic insulating layer 24 and the close-adhesion layer 13 is advantageously facilitated.

The protective layer 30 is formed to cover the capacitance section 20 and the inorganic insulating layer 24. The protective layer 30 is formed, for example, for the purpose of preventing the penetration of water into the capacitance section 20. The protective layer 30 has an inorganic protective layer 31 and an organic protective layer 33. The material of the inorganic protective layer 31 may be, for example, $SiN_x$, $SiO_2$, $Al_2O_3$, or $TiO_2$. The material of the organic protective layer 33 may be, for example, a polyimide resin or an epoxy resin.

In the present embodiment, the end of the close-adhesion layer 13 is exposed from the protective layer 30. Therefore, since the close-adhesion layer 13 intervenes between the inorganic protective layer 31 and the substrate 11, peeling-off of the inorganic protective layer 31 from the substrate 11 can be prevented. The peeling-off may cause defects between the inorganic protective layer 31 and the substrate 11. When water is present in the defects, it will be a cause of the penetration of water into the capacitance section 20, thereby raising a fear of deteriorating the characteristics.

An outside electrode 43 is electrically connected to the lower electrode layer 21 via an extraction electrode 41. The extraction electrode 41 is formed to penetrate through the dielectric layer 22, the inorganic protective layer 31, and the organic protective layer 33. Further, the extraction electrode 41 extends to the upper part of the organic protective layer 33. Also, an outside electrode 44 is electrically connected to the upper electrode layer 23 via an extraction electrode 42. The extraction electrode 42 is formed to penetrate through the inorganic insulating layer 24, the inorganic protective layer 31, and the organic protective layer 33. Further, the extraction electrode 42 extends to the upper part of the organic protective layer 33.

The outside electrodes 43 and 44 are constituted, for example, of a two-layer structure. A combination of the materials of the two-layer structure may be, for example, Ni and Au. Also, the extraction electrodes 41 and 42 are constituted, for example, of a two-layer structure. A combination of the materials of the two-layer structure may be, for example, Ti and Cu.

In the present embodiment, a metal film 45 is formed on at least a part of the end of the protective layer 30. Further, the metal film 45 is preferably in contact with the close-adhesion layer 13. In other words, the close-adhesion layer 13 extends to a position that is in contact with the metal film 45. In such a case, the penetration of water into the defects between the protective layer 30 and the substrate 11 can be prevented by the presence of the metal film 45.

Also, the metal film 45 is preferably formed to cover the outer circumferential part of the interface between the inorganic protective layer 31 and the organic protective layer 33. This is because, in such a case, the penetration of water through the outer circumferential part of the interface between the inorganic protective layer 31 and the organic protective layer 33 can be prevented.

The metal film 45 is constituted, for example, of a two-layer structure. A combination of the materials of the two-layer structure may be, for example, Ti and Cu.

An organic insulating layer 34 is formed to cover the inorganic protective layer 31, the organic protective layer 33, the extraction electrodes 41 and 42 and the metal film 45. Further, the outside electrodes 43 and 44 are formed so that they are exposed to the surface of the dielectric thin film element 10. The material of the organic insulating layer 34 may be, for example, a polyimide resin or an epoxy resin.

Here, in the present embodiment, the inorganic protective layer 31 has a mono-layer structure; however, the inorganic protective layer 31 preferably has a multi-layer structure. This is because, as the number of layers of the inorganic protective layer 31 increases, the possibility of water reaching the capacitance section 20 seems to be lowered, and also the deterioration of the characteristics seems to be eliminated.

Also, in the present embodiment, the dielectric layer 22 has a mono-layer structure; however, it is possible to adopt a structure in which a plurality of the dielectric layers 22 and electrode layers are alternately disposed in order to ensure electrostatic capacitance.

Also, in the present embodiment, the inorganic insulating layer 24 is disposed, for example, to improve the close-adhesion property between the upper electrode layer 23 and the protective layer 30; however, the inorganic insulating layer 24 is not necessarily required.

Next, one example of a method for producing the above dielectric thin film element will be described in detail with reference to FIGS. 3 to 5.

Figure 3A:
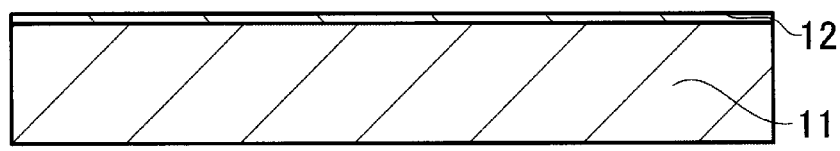
FIGS. 3(a) to 3(c) are cross-sectional views showing one embodiment of a method for producing a dielectric thin film element according to the present invention.

First, a substrate 11 is prepared as shown in FIG. 3(a). For example, a Si substrate is prepared on which an $SiO_2$ layer of 500 to 1000 nm has been formed as an oxide layer 12. The $SiO_2$ layer is formed, for example, by thermally treating the Si substrate.

Figure 3B:
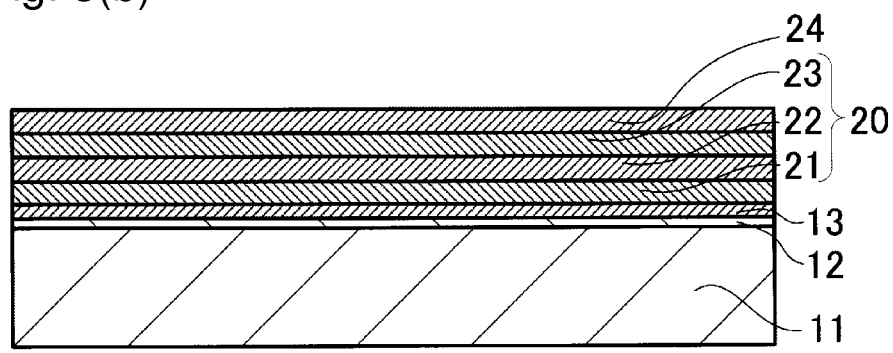

Next, as shown in FIG. 3(b), a close-adhesion layer 13, a lower electrode layer 21, a dielectric layer 22, an upper electrode layer 23, and an inorganic insulating layer 24 are formed.

First, the close-adhesion layer 13 is formed on the substrate 11. As the close-adhesion layer 13, for example, a BST layer having a thickness of 10 to 100 nm is formed. The close-adhesion layer 13 is formed, for example, by the chemical solution deposition (Chemical Solution Deposition; hereafter referred to as "CSD") method. Specifically, on the top surface of the Si substrate on which the oxide layer has been formed, a dielectric source material solution containing an organic metal compound is applied by the spin coating method so as to attain Ba:Sr:Ti=70:30:100 (molar ratio). Thereafter, the resultant is dried at 300 to 400° C. on a hot plate. Thereafter, a heating treatment is carried out under a condition of 600 to 700° C. for 10 to 60 minutes.

Next, a capacitance section 20 having the lower electrode layer 21, the dielectric layer 22, and the upper electrode layer 23 is formed on the close-adhesion layer 13. First, the lower electrode layer 21 is formed on the close-adhesion layer 13. As the lower electrode layer 21, for example, a Pt layer having a thickness of 100 to 500 nm is formed. The lower electrode layer 21 is formed, for example, by the sputtering method. Further, the dielectric layer 22 is formed on the lower electrode layer 21. As the dielectric layer 22, a BST layer having a thickness of 50 to 200 nm is formed by a method similar to that of the BST layer described above. Further, the upper electrode layer 23 is formed on the dielectric layer 22. As the upper electrode layer 23, a Pt layer having a thickness of 100 to 500 nm is formed by a method similar to that of the Pt layer described above.

Subsequently, the inorganic insulating layer 24 is formed on the capacitance section 20. As the inorganic insulating layer 24, for example, a BST layer having a thickness of 10 to 100 nm is formed by the CSD method.

Figure 3C:
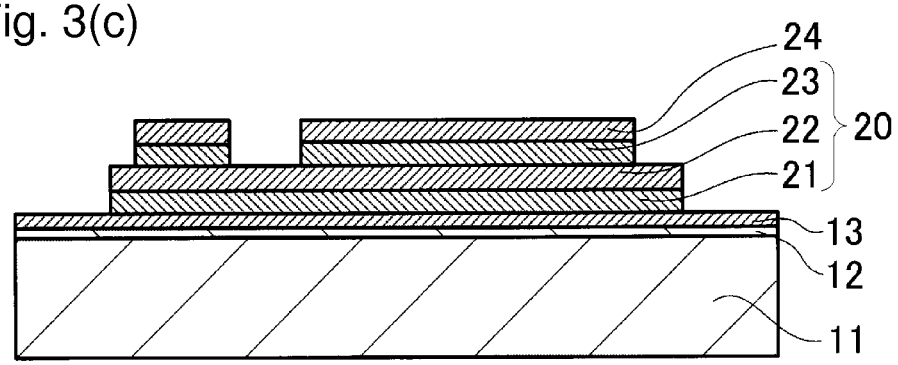

Subsequently, the inorganic insulating layer 24, the upper electrode layer 23, the dielectric layer 22, and the lower electrode layer 21 are patterned as shown in FIG. 3(c). First, the inorganic protective layer 24 and the upper electrode layer 23 are patterned. For example, a resist is applied onto the inorganic protective layer 24, followed by exposure and development to form a resist pattern. Further, after the patterning into a predetermined shape is carried out by the Ar ion milling method, the resist is removed by asking. By a similar method, after the dielectric layer 22 and the lower electrode layer 21 are patterned, the resist is removed. At this time, the inorganic protective layer 24 and the upper electrode layer 23 can be patterned simultaneously, as shown in FIG. 3(c). Also, the dielectric layer 22 and the lower electrode layer 21 can be patterned simultaneously. In this case, the patterning can be carried out at a low cost as compared with the case of changing etching pattern for the BST layer and for the Pt layer.

Subsequently, a thermal treatment at 700 to 900° C. for 30 minutes may be carried out, for example.

Subsequently, a protective layer 30 is formed to cover the capacitance section 20 and the inorganic insulating layer 24.

Figure 4D:
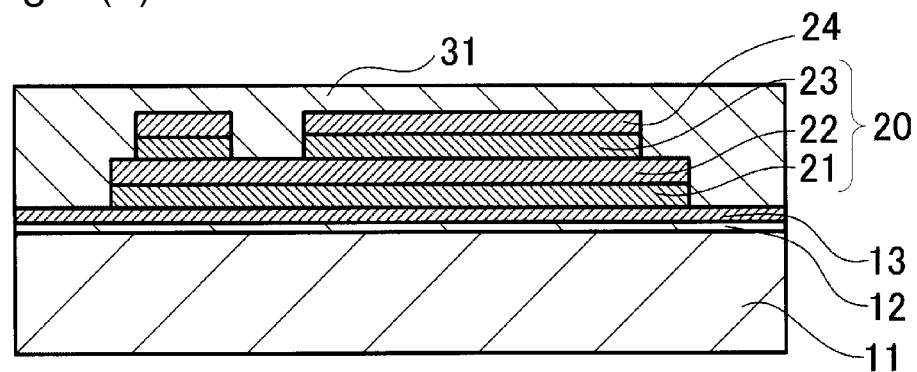
FIGS. 4(d) to 4(f) are cross-sectional views showing one embodiment of a method for producing a dielectric thin film element according to the present invention.

First, as shown in FIG. 4(d), an inorganic protective layer 31 is formed to cover the capacitance section 20 and the inorganic insulating layer 24. The thickness of the inorganic protective layer 31 is, for example, 200 to 1000 nm. The inorganic protective layer 31 is formed, for example, by the PECVD (Plasma-Enhanced CVD) method or the sputtering method.

Figure 4E:
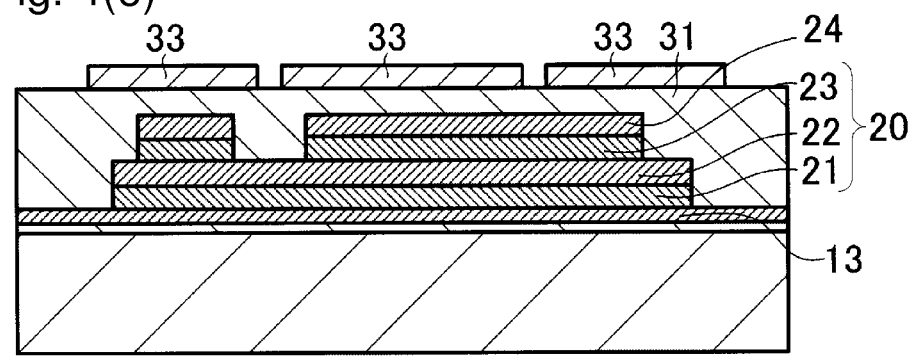

Further, as shown in FIG. 4(e), an organic protective layer 33 is formed on the inorganic protective layer 31. The thickness of the organic protective layer 33 is, for example, 2 to 10 mm. The organic protective layer 33 is formed, for example, by performing spin-coating with a photosensitive resin material, followed by exposure, development, and curing.

Figure 4F:
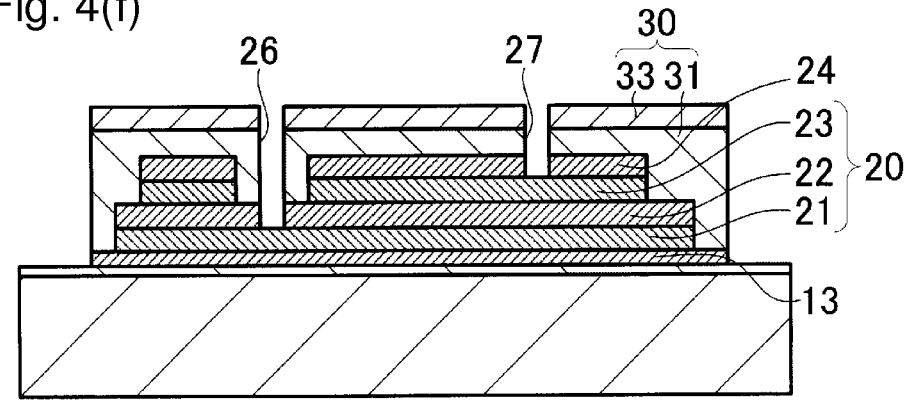

Subsequently, as shown in FIG. 4(f), an opening 26 that penetrates through the protective layer 30 and the dielectric layer 22 is formed, and simultaneously, a part of the close-adhesion layer 13 is removed. Specifically, the organic protective layer 33 is used as a mask pattern, and the inorganic protective layer 31 is patterned with use of a $CHF_3$ gas, for example. The opening 26 is formed so that a part of the lower electrode layer 21 will be exposed. At this time, the dielectric layer 22 and the close-adhesion layer 13 are preferably constituted of materials of the same composition system or of the same materials. This is because, when the dielectric layer 22 and the close-adhesion layer 13 are constituted of materials of the same composition system or of the same materials, simultaneous processing of the dielectric layer 22 and the close-adhesion layer 13 is advantageously facilitated.

Also, in the present embodiment, simultaneously with the removal of a part of the close-adhesion layer 13, an opening 27 that penetrates through the protective layer 30 and the inorganic insulating layer 24 is formed. The opening 27 is formed so that a part of the upper electrode layer 21 will be exposed.

Figure 5G:
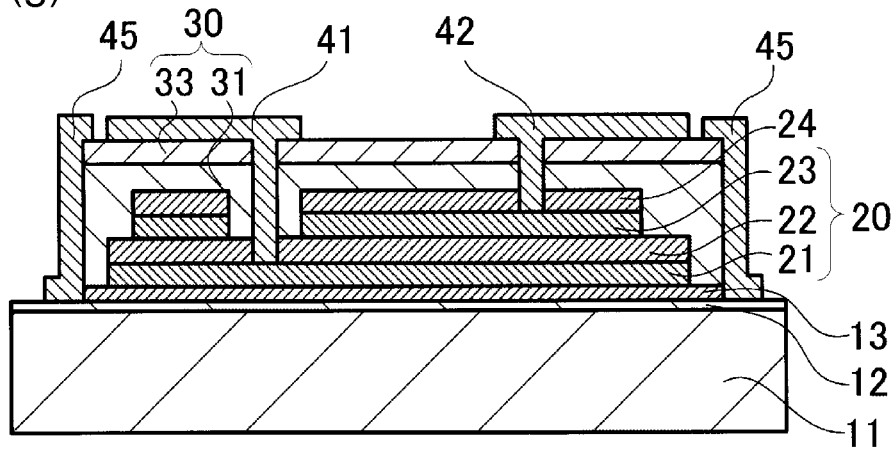
FIGS. 5(g) to 5(i) are cross-sectional views showing one embodiment of a method for producing a dielectric thin film element according to the present invention.

Subsequently, as shown in FIG. 5(g), extraction electrodes 41 and 42 and a metal film 45 are simultaneously formed. For example, a Ti layer and a Cu layer are continuously formed by using magnetron sputtering. The Ti layer and the Cu layer are formed along with the inner circumferential surface and bottom surface of the opening.

Thereafter, application of a resist, exposure, and development are sequentially carried out to form a resist pattern. Then, with use of the resist pattern as a mask, the Cu layer is patterned by the Ar ion milling method. Subsequently, with use of the resist pattern as it is, the Ti layer is patterned. The extraction electrode 41 is formed to be connected to the lower electrode layer 21. Also, the extraction electrode 42 is formed to be connected to the upper electrode layer 23. The metal film 45 is formed to cover at least a part of the end of the protective layer 30.

Figure 5H:
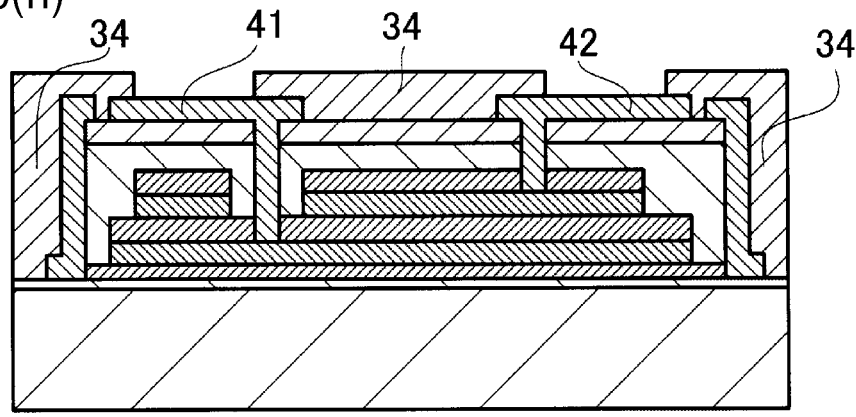

Subsequently, as shown in FIG. 5(h), an organic insulating layer 34 is formed so that a part of the extraction electrodes 41 and 42 will be exposed. For example, spin-coating is carried out with use of an epoxy resin, followed by exposure, development, and curing in turn to form the organic insulating layer 34. The thickness of the organic insulating layer is, for example, 2 to 10 mm.

Figure 5I:
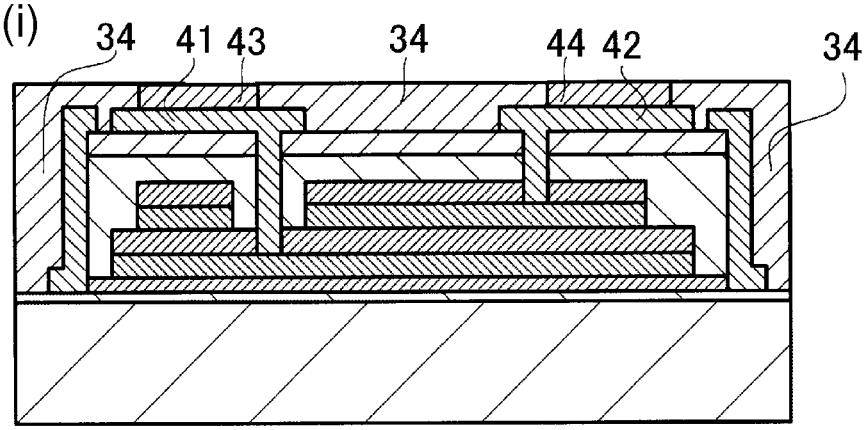

Finally, as shown in FIG. 5(i), the outside electrodes 43 and 44 are formed at the exposed parts of the extraction electrodes 41 and 42. Specifically, a Ni layer and an Au layer are formed, for example, by nonelectrolytic plating in the opening of the resist pattern. When a plurality of dielectric thin film elements are simultaneously formed on one sheet of a substrate, individual dielectric thin film elements may be cut out and taken out from the substrate. In this manner, the dielectric thin film element is fabricated.

Here, the present invention is not limited to the above-described embodiments. The thickness of each layer, the formation methods, and the formation conditions are merely exemplification, so that they can be changed in an arbitrary manner within a range that does not deteriorate the functions of the dielectric thin film elements.

EXPERIMENTAL EXAMPLES

Dielectric thin film elements were fabricated in the following manner.

Experimental Example 1

A dielectric thin film element such as shown in FIG. 2 was fabricated as an Experimental Example 1.

First, a Si substrate on which an $SiO_2$ layer having a thickness of 700 nm had been formed as an oxide layer was prepared.

Next, a close-adhesion layer was formed on the substrate. Specifically, a BST layer of 50 nm was formed. First, on the top surface of the Si substrate on which the oxide layer had been formed, a dielectric source material solution containing an organic metal compound was applied by spin coating so as to attain Ba:Sr:Ti=70:30:100 (molar ratio). Thereafter, the resultant was dried under a condition of 350° C. on a hot plate. Thereafter, a heating treatment was carried out under a condition of 650° C. for 30 minutes.

Next, as a lower electrode layer, a Pt layer having a thickness of 200 nm was formed on the close-adhesion layer. The Pt layer was formed by the sputtering method.

Next, a dielectric layer and an upper electrode layer were sequentially formed. Specifically, a BST layer having a thickness of 90 nm was formed on the Pt layer by a method similar to that of the above-described BST layer. Then, a Pt layer having a thickness of 200 nm was formed on the BST layer by a method similar to that of the above-described Pt layer.

Next, an inorganic insulating layer was formed on the upper electrode layer. Specifically, a BST layer having a thickness of 90 nm was formed by a method similar to that of the above-described BST layer.

Next, the inorganic insulating layer and the upper electrode layer were subjected to etching. Thereafter, the dielectric layer and the lower electrode layer were subjected to etching. First, a resist was applied onto the BST layer, which was the inorganic insulating layer, followed by exposure and development to form a resist pattern. Then, patterning into a predetermined shape was carried out by the Ar ion milling method. Thereafter, the dielectric layer and the lower electrode layer were subjected to etching by a similar method.

Next, a thermal treatment of 850° C. for 30 minutes was carried out on the above-mentioned laminate structure.

Next, an inorganic protective layer was formed. Specifically, an $SiO_2$ layer having a thickness of 400 nm was formed by the PECVD method.

Then, an organic protective layer was formed on the inorganic protective layer. Specifically, spin-coating was carried out with photosensitive polyimide, followed by exposure, development, and curing to form an organic protective layer of polyimide resin having a thickness of 2 mm.

Next, with use of the organic protective layer as a mask pattern, the inorganic protective layer was patterned by using a $CHF_3$ gas. At this time, an opening was formed so as to expose a part of the upper electrode layer and a part of the lower electrode layer. Simultaneously with this process, a part of the close-adhesion layer was removed.

Next, an extraction electrode and a metal film were simultaneously formed. Specifically, a Ti layer (having a layer thickness of 100 nm) and a Cu layer (having a layer thickness of 1000 nm) were successively formed by using magnetron sputtering. Thereafter, application of a resist, exposure, and development were sequentially carried out to form a resist pattern. Then, with use of the resist pattern as a mask, the Cu layer was patterned by the Ar ion milling method. Subsequently, with use of the resist pattern as it was, the Ti layer was patterned.

Next, an organic insulating layer was formed so that a part of the extraction electrode would be exposed. Specifically, spin-coating was carried out with a photosensitive epoxy resin, followed by exposure, development, and curing in turn to form an epoxy layer having a thickness of 2 mm.

Next, an outside electrode was formed on the exposed part of the extraction electrode. A Ni layer having a thickness of 1 mm was formed by nonelectrolytic plating in the opening of the resist pattern. An Au layer having a thickness of 0.05 mm was formed thereon.

Finally, the substrate was cut and dielectric thin film elements were taken out.

Experimental Example 2

Figure 6:
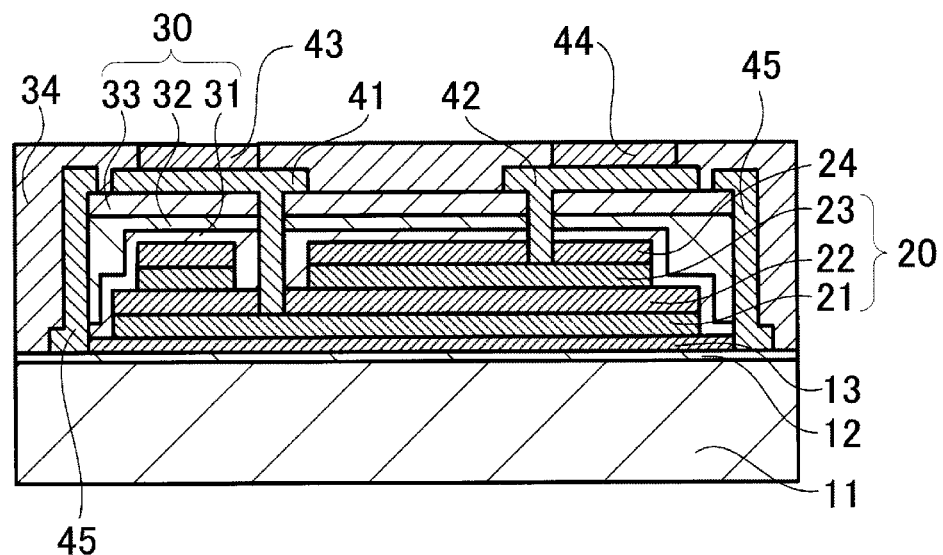
FIG. 6 is a cross-sectional view showing one embodiment of a dielectric thin film element according to the present invention. (Experimental Example 2)

A dielectric thin film element such as shown in FIG. 6 was fabricated as Experimental Example 2. The dielectric thin film element of FIG. 6 is formed in such a manner that the inorganic protective layer has a two-layer structure made of a first inorganic protective layer 31 and a second inorganic protective layer 32. As the first inorganic protective layer 31, an $SiN_x$ layer having a thickness of 50 nm was formed by the sputtering method. Also, as the second inorganic protective layer, an $SiO_2$ layer having a thickness of 400 nm was formed by the PECVD method. The constitutions other than that are similar to those of Experimental Example 1, and the fabrication was made by a process similar to that of Experimental Example 1.

Comparative Example

Figure 7:
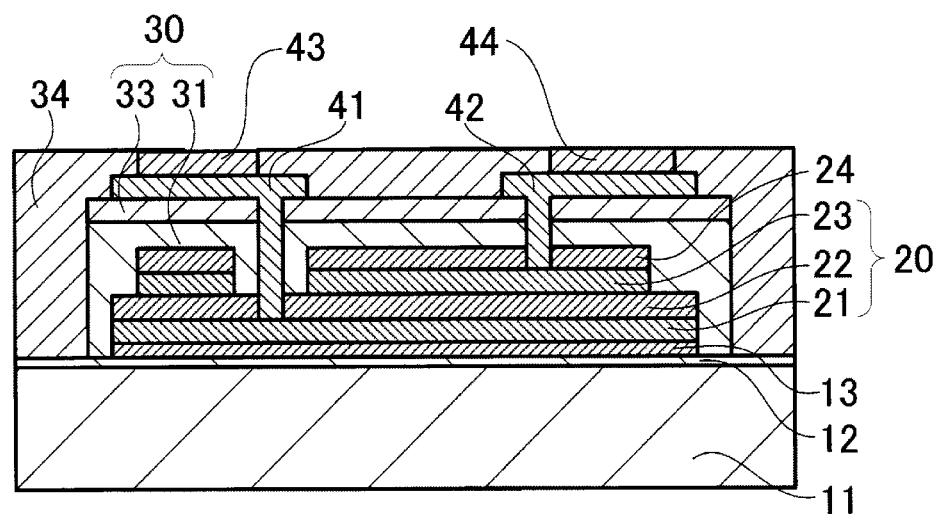
FIG. 7 is a cross-sectional view showing a known dielectric thin film element. (Comparative Example)
Figure 8:
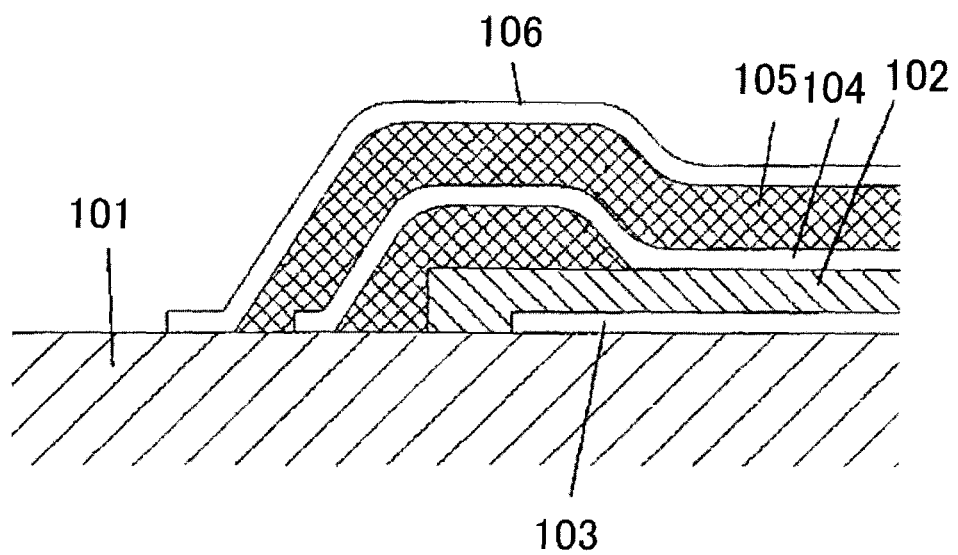
FIG. 8 is a cross-sectional view showing a conventional dielectric thin film element.

A dielectric thin film element such as shown in FIG. 7 was fabricated as a comparative example. The dielectric thin film element of FIG. 7 does not have a metal film, and the end of the close-adhesion layer 13 is covered with the inorganic protective layer 31. For this reason, removal of a part of the close-adhesion layer 13 was carried out at the time of patterning the dielectric layer 22 and the lower electrode layer 21. The constitutions other than that are the same as those of Experimental Example 1, and the fabrication was made by a process similar to that of Experimental Example 1.

The following evaluation was carried out on the obtained dielectric thin film elements of Experimental Example 1, Experimental Example 2, and the comparative example.

First, a humidity resistance load test (121° C., 85% RH, +4 V, 48 hr) was carried out. Further, the relative permittivity and the leakage current density before and after the test were compared. Table 1 shows a result of measuring the relative permittivity before and after the test. Also, Table 2 shows a result of measuring the leakage current density before and after the test. Here, the humidity resistance load test was carried out by using 10 samples, and tables show average values.

TABLE 1

|  | Relative permittivity | |
| --- | --- | --- |
|  | Before the test | After the test |
| Example 1 | 420 | 420 |
| Example 2 | 425 | 425 |
| Comparative Example | 420 | 420 |

TABLE 2

|  | Leakage current density (at +4 V, $A/mm^2$) | |
| --- | --- | --- |
|  | Before the test | After the test |
| Example 1 | 7.20E−08 | 9.50E−08 |
| Example 2 | 3.40E−08 | 4.50E−08 |
| Comparative Example | 7.00E−08 | 9.40E−08 |

From Table 1, there was no change in the relative permittivity before and after the test in both of Experimental Example 1 and Experimental Example 2 as well as in the comparative example.

Also, from Table 2, it was found out that the leakage current characteristics of Experimental Example 1 were of the same degree as those of the comparative example. On the other hand, it was found out that the leakage current density could be reduced in Experimental Example 2 as compared with Experimental Example 1 and the comparative example.

Also, in order to achieve a further reduction in costs, the patterning of FIG. 5(g) was changed from the Ar ion milling method to the wet etching method under the conditions of Experimental Example 1 and Comparative Example 1. As a result, in the structure of Experimental Example 1, characteristics equivalent to those of the structure fabricated by the Ar ion milling method were obtained. However, in the structure of Comparative Example 1, the sample ends were exposed to the aqueous hydrofluoric acid solution, which is an etchant of Ti, whereby the organic protective layer was peeled off, and a sample that cannot produce desired characteristics was generated.

From the above description, it has been made clear that the dielectric thin film element according to the present invention has high humidity resistance and can be fabricated at a lower cost as compared with a conventional structure.

DESCRIPTION OF REFERENCE SYMBOLS

10: dielectric thin film element
11: substrate
12: oxide layer
13: close-adhesion layer
20: capacitance section
21: lower electrode layer
22: dielectric layer
23: upper electrode layer
24: inorganic insulating layer
26, 27: opening
30: protective layer
31: inorganic protective layer (first inorganic protective layer)
32: second inorganic protective layer
33: organic protective layer
34: organic insulating layer
41, 42: extraction electrode
43, 44: outside electrode
45: metal film
101: substrate
102: dielectric layer
103: lower electrode layer
104: upper electrode layer
105: insulating protective layer
106: metal thin film

The invention claimed is:

1. A dielectric thin film element comprising:
   a substrate;
   a close-adhesion layer adjacent a surface of the substrate;
   a capacitance section having a first electrode layer adjacent the close-adhesion layer, a dielectric layer adjacent the first electrode layer, and a second electrode layer adjacent the dielectric layer; and
   a protective layer covering the capacitance section, wherein
   an end of the close-adhesion layer is exposed from the protective layer, and
   the close-adhesion layer and the dielectric layer each comprise a material of a same composition system or of a same material.

2. The dielectric thin film element according to claim 1, further comprising a metal film on at least a part of an end of the protective layer, the close-adhesion layer being in contact with the metal film.

3. The dielectric thin film element according to claim 2, wherein the protective layer includes an inorganic protective layer and an organic protective layer, and the metal film covers at least a part of an interface between the inorganic protective layer and the organic protective layer.

4. The dielectric thin film element according to claim 1, wherein the protective layer includes an inorganic protective layer and an organic protective layer.

5. The dielectric thin film element according to claim 4, wherein the inorganic protective layer has a multi-layer structure.

6. The dielectric thin film element according to claim 1, further comprising an inorganic insulating layer between the second electrode and the protective layer.

7. The dielectric thin film element according to claim 1, further comprising an oxide layer between the substrate and the close-adhesion layer.

8. A dielectric thin film element comprising:
   a substrate;
   a close-adhesion layer adjacent a surface of the substrate;
   a capacitance section having a first electrode layer adjacent the close-adhesion layer, a dielectric layer adjacent the first electrode layer, and a second electrode layer adjacent the dielectric layer;
   a protective layer covering the capacitance section; and
   an inorganic insulating layer between the second electrode and the protective layer, wherein
   an end of the close-adhesion layer is exposed from the protective layer, and
   the close-adhesion layer and the inorganic insulating layer each comprise a material of a same composition system or of a same material.

* * * * *